United States Patent
Son et al.

(10) Patent No.: US 8,356,135 B2
(45) Date of Patent: Jan. 15, 2013

(54) MEMORY DEVICE AND CONTROL METHOD

(75) Inventors: Min Young Son, Seoul (KR); Gyu Sang Choi, Seoul (KR); Jae Don Lee, Paju-si (KR); Choong Hun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 12/470,552

(22) Filed: May 22, 2009

(65) Prior Publication Data

US 2009/0282188 A1   Nov. 12, 2009

(30) Foreign Application Priority Data

Dec. 5, 2008 (KR) .................. 10-2008-0123060

(51) Int. Cl.
*G06F 12/02* (2006.01)
(52) U.S. Cl. ........................ 711/103; 711/E12.008
(58) Field of Classification Search .................. 711/103, 711/E12.008
See application file for complete search history.

(56) References Cited

U.S. PATENT DOCUMENTS

| 5,842,038 | A  | * | 11/1998 | Williams et al. .................. 710/5 |
| 6,452,693 | B1 | * | 9/2002 | Isoda et al. .................... 358/1.16 |
| 2003/0149838 | A1 | * | 8/2003 | Mowery et al. ................ 711/113 |
| 2004/0049628 | A1 |   | 3/2004 | Lin et al. |
| 2008/0141256 | A1 |   | 6/2008 | Forrer, Jr. et al. |
| 2009/0132761 | A1 | * | 5/2009 | Yim et al. ...................... 711/114 |
| 2009/0172248 | A1 | * | 7/2009 | You .............................. 711/103 |
| 2009/0216959 | A1 | * | 8/2009 | Allison et al. ................. 711/149 |

FOREIGN PATENT DOCUMENTS

| JP | 2005-202976 | | 7/2005 |
| JP | 2008-108089 | | 5/2008 |
| KR | 2004-091010 | * | 11/2004 |

* cited by examiner

*Primary Examiner* — Hoai V Ho
(74) *Attorney, Agent, or Firm* — NSIP Law

(57) ABSTRACT

A memory device includes a first controller and a second controller. The first controller receives a first command from a host and stores the first command in a first command queue, and transmits the first command to the second controller relating to the first command stored in the first command queue. The second controller transmits the first command stored in the second command queue to a flash memory.

13 Claims, 6 Drawing Sheets

MEMORY DEVICE AND CONTROL METHOD

CROSS-REFERENCE TO RELATED APPLICATION(S)

This application claims the benefit under 35 U.S.C. §119 (a) of a Korean Patent Application No. 10-2008-0123060, filed on Dec. 5, 2008, in the Korean Intellectual Property Office, the entire disclosure of which is incorporated herein by reference.

BACKGROUND

1. Field

The following description relates to a memory device and a method of controlling the memory device.

2. Description of Related Art

A solid state drive (SSD) is lighter, smaller, and more stable (for example, have higher mechanical reliability) than a hard disk drive (HDD), and therefore, the SSD can be a substitute storage device for the HDD. To replace the HDD, the SSD provides compatibility with a communication standard or with a host interface such as a parallel Advanced Technology Attachment (PATA), a serial ATA (SATA), and the like.

Also, the communication standard such as SATA and the like may use a command queue to increase efficiency. The command queue may store a predetermined number of commands. A process in which the command queue stores a command is referred to as inqueue. Also, the command queue may read a command stored in advance. This process of reading a command stored in advance is referred to as dequeue.

First-in first-out (FIFO) can be used as a method to determine a dequeue-sequence of commands stored in the command queue. In a command queue of HDD, commands stored in the command queue may be dequeued according a sequence that minimizes or reduces a motion of a disk head of the HDD. The SSD may not use a disk head, and thus, may use a different method of performing dequeueing.

SUMMARY

In one general aspect, a memory device includes a first controller and a second controller. The first controller is configured to receive a first command from a host to store in a first command queue, and to transmit the first command to the second controller relating to the first command stored in the first command queue. The second controller is configured to store the first command received from the first controller in a second command queue, and to transmit the first command stored in the second command queue to a flash memory.

Implementations may include one or more of the following features. For example, the first controller may include a Host Interface Layer (HIL) used for communicating with the host. The second controller may include a Flash Translation Layer (FTL) to store mapping information between a logical page address corresponding to the first command and physical page address corresponding to the first command, and a Flash Interface Layer (FIL) to communicate between the second controller and the flash memory.

The second controller may be configured to transmit the command stored in the second command queue to the flash memory if the second command queue is not empty. The first controller may be configured to transmit the command stored in the first command queue to the second controller if the second command queue is empty.

In another general aspect, a memory device includes a first controller and a plurality of second controllers. The first controller is configured to store a command received from a host in a first command queue. The plurality of second controllers is configured to respectively store a command received from the first controller in a second command queue, and to respectively transmit a command read from the second command queue to the flash memory. The first controller is configured to read a first command from the first command queue, search for a second controller relating to the first command from among the plurality of the second controllers, and transmit the first command to the second controller relating to the first command.

If a command that is not transmitted to the flash memory exists in at least one second command queue of the plurality of the second controllers, the first controller may be configured to read the command stored in the first command queue to transmit to the second controller, after transmitting the command that is not transmitted to the flash memory to the flash memory.

The flash memory may include a plurality of volumes, the plurality of volumes respectively corresponding to the plurality of second controllers. Also, each of the plurality of volumes may include at least one flash memory channel.

In another general aspect, a memory is controlled by storing a command received from a host in a first command queue, reading a first command from commands that are stored in the first command queue, and storing the first command in a second command queue.

The reading and the storing of the first command in the second command queue may include reading the first command stored in the first command queue, searching for a second command queue relating to the first command, and storing the first command in the second command queue.

The first command may be read from the second command queue, and the read first command may be transmitted to a flash memory.

The reading and the transmitting of the first command may further include reading the first command from the second command queue, translating a logical page address corresponding to the first command into a physical page address corresponding to the first command, and transmitting the first command and physical page address information of the first command to the flash memory.

The memory controlling method may include reading the second command stored in the first command queue, and storing the read second command in the second command queue if the second command queue is empty.

The SSD provides for parallel processing of a command to improve efficiency using a command queue. Also, if a command is dequeued in the command queue, waiting due to a busy condition occurs while the dequeued command is processed. Accordingly, to perform parallel processing of the command, waiting due to the busy condition can be reduced.

The memory device and the method for controlling the memory device improve a processing rate by processing a received command in parallel. Moreover, the memory device and the method of controlling the memory device can increase efficiency of resources by reducing a bottleneck in processing of a command.

Other features and aspects will be apparent from the following detailed description, the drawings, and the claims.

Figure 1:
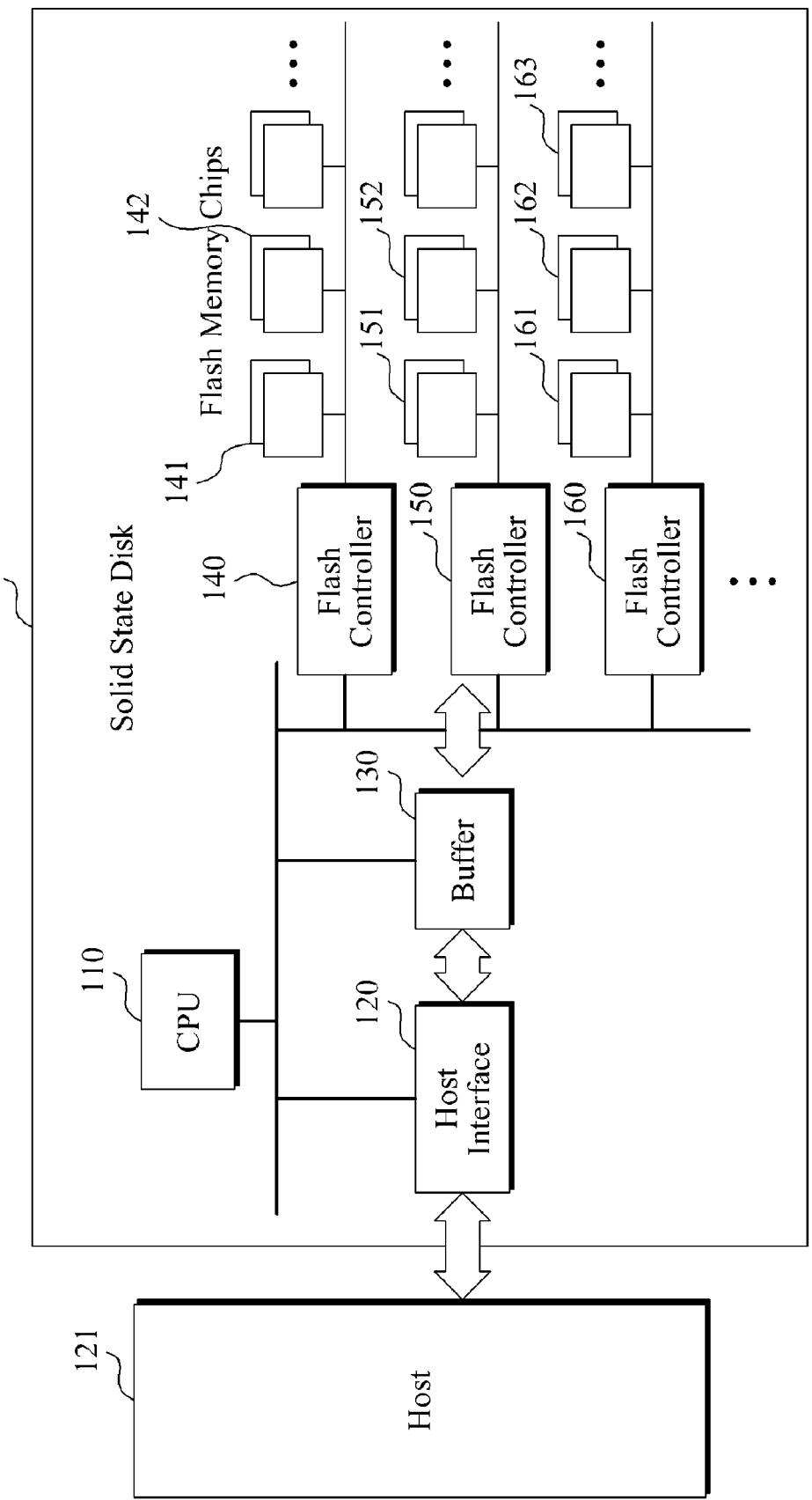
FIG. 1 is a block diagram of an exemplary memory device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Referring to FIG. 1, a memory device 100 includes a central processing unit (CPU) 110, a host interface 120, a buffer 130, and a flash memory. The memory device 100 may be a solid state drive (SSD) including the flash memory. The SSD is a device embodying a high-capacity storage using a plurality of flash memory chips.

The flash memory includes a plurality of volumes. Also, each of the plurality of volumes include at least one memory channel so that the flash memory may have a plurality of channels. The flash memory also includes flash controllers 140 to 160 respectively corresponding to the plurality of channels.

The flash controller 140 controls a flash memory chip 141 and a flash memory chip 142, performs a task in response to and corresponding to a command transmitted from the CPU 110, and provides data.

Also, the flash controller 150 controls a flash memory chip 151 and a flash memory chip 152, and the flash controller 160 controls flash memory chips 161 to 163.

The flash memory is used for embodying a high-capacity storage. Although the present example is described using the flash memory, the present example is not limited to a configuration of a specific memory, and the flash memory may be a different type of non-volatile memory for storing data.

The flash memory may be a NAND flash memory or a NOR flash memory. Although we describe that the flash memory is the NAND flash memory, the present example is not limited to a flash memory being the NAND flash memory.

The flash memory chips 141, 142, 151, 152, 161, 162, and 163 respectively include a plurality of blocks, and each of the plurality of blocks includes a plurality of pages.

The CPU 110 stores a command received from a host 121 via a host interface 120 in a first command queue. Also, a first volume relating to a first command that is read from the first command queue is selected from among the plurality of volumes of the flash memory. Subsequently, the selected first command is stored in a second command queue (or in a volume queue) corresponding to the first volume. This process is referred to as an upper task.

Also, the CPU 110 changes a logical page address corresponding to the first command read from the volume queue into a physical page address corresponding to the first command using a Flash Translation Layer (FTL), and transmits the first command to a flash controller that controls the first volume using a Flash Interface Layer (FIL). This process is referred to as a lower task.

The FTL may be stored in a DRAM (not illustrated) together with the buffer 130. Also, the first command queue and the second command queue may be a part of the DRAM.

The upper task and the lower task are described in detail with reference to FIG. 3.

Figure 2:
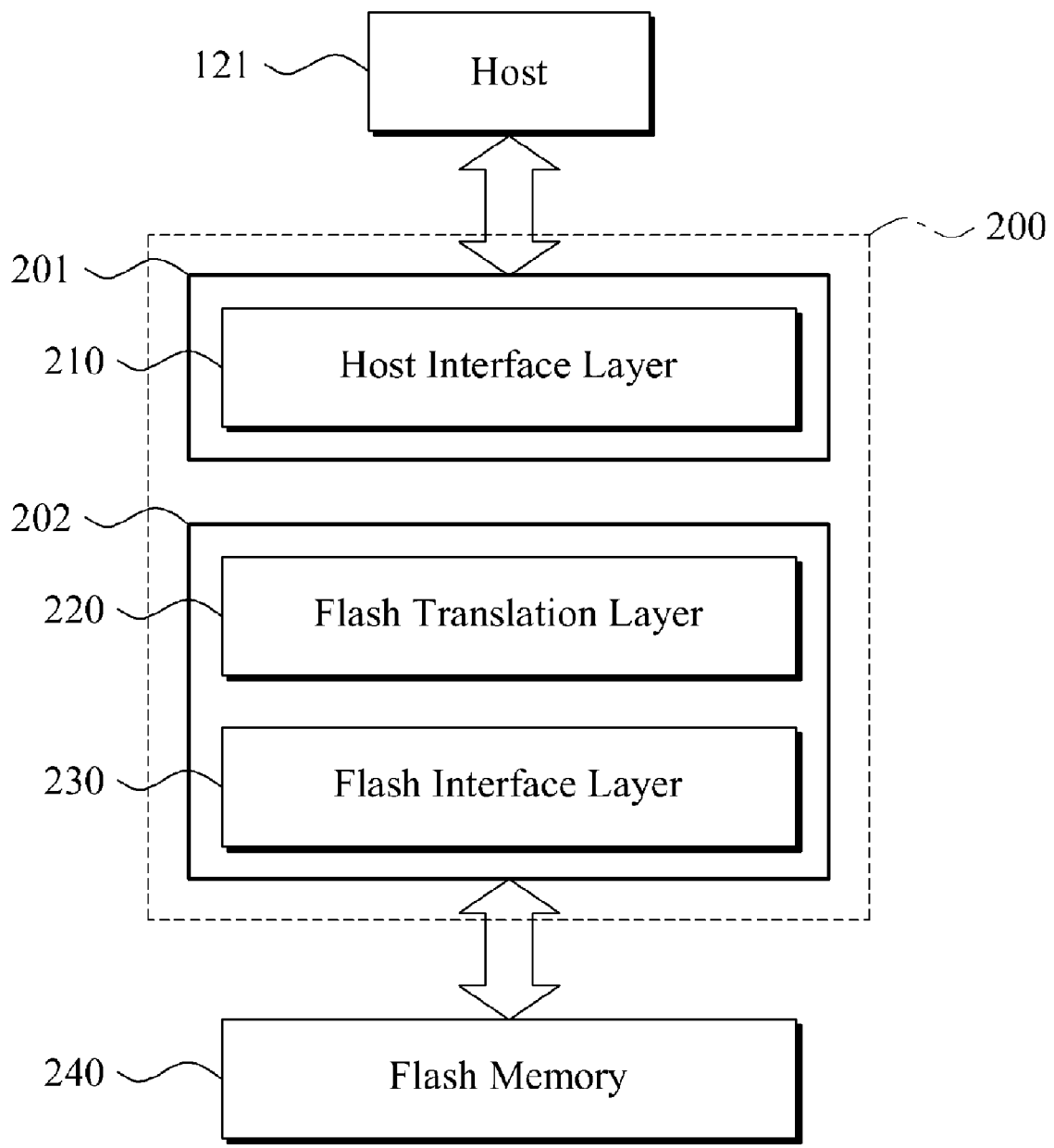
FIG. 2 is a block diagram of an exemplary first controller and an exemplary second controller that can be used in the memory device of FIG. 1.

FIG. 2 illustrates an exemplary controller 200 including a first controller 201 and a second controller 202 of a memory device.

The controller 200 of the memory device receives a command from a host 121 and transmits the command to a flash memory 240. The controller 200 may also transmit data corresponding to the command to the host 121. The controller 200 may be a CPU 110 that controls a host interface 120 and a buffer 130 using SSD software in a memory device 100 of FIG. 1.

The first controller 201 receives the command from the host 121, and includes a host interface layer 210 to transmit data corresponding to the command to the host 121.

An operation of the first controller 201 is described in detail with reference to FIGS. 3 and 4.

The second controller 202 transmits the command transmitted from the first controller 201 to the flash memory 240, and transmits data transmitted from the flash memory 240 to the first controller 201. The second controller 202 includes a flash translation layer (FTL) 220 that includes mapping information between a logical page address corresponding to the transmitted command and a physical page address corresponding to the transmitted command. Also, the second controller 202 typically includes a flash interface layer (FIL) 230 for communication between the controller 200 and the flash memory 240.

An operation of the second controller 202 is described in detail with reference to FIGS. 3 and 5.

Figure 3:
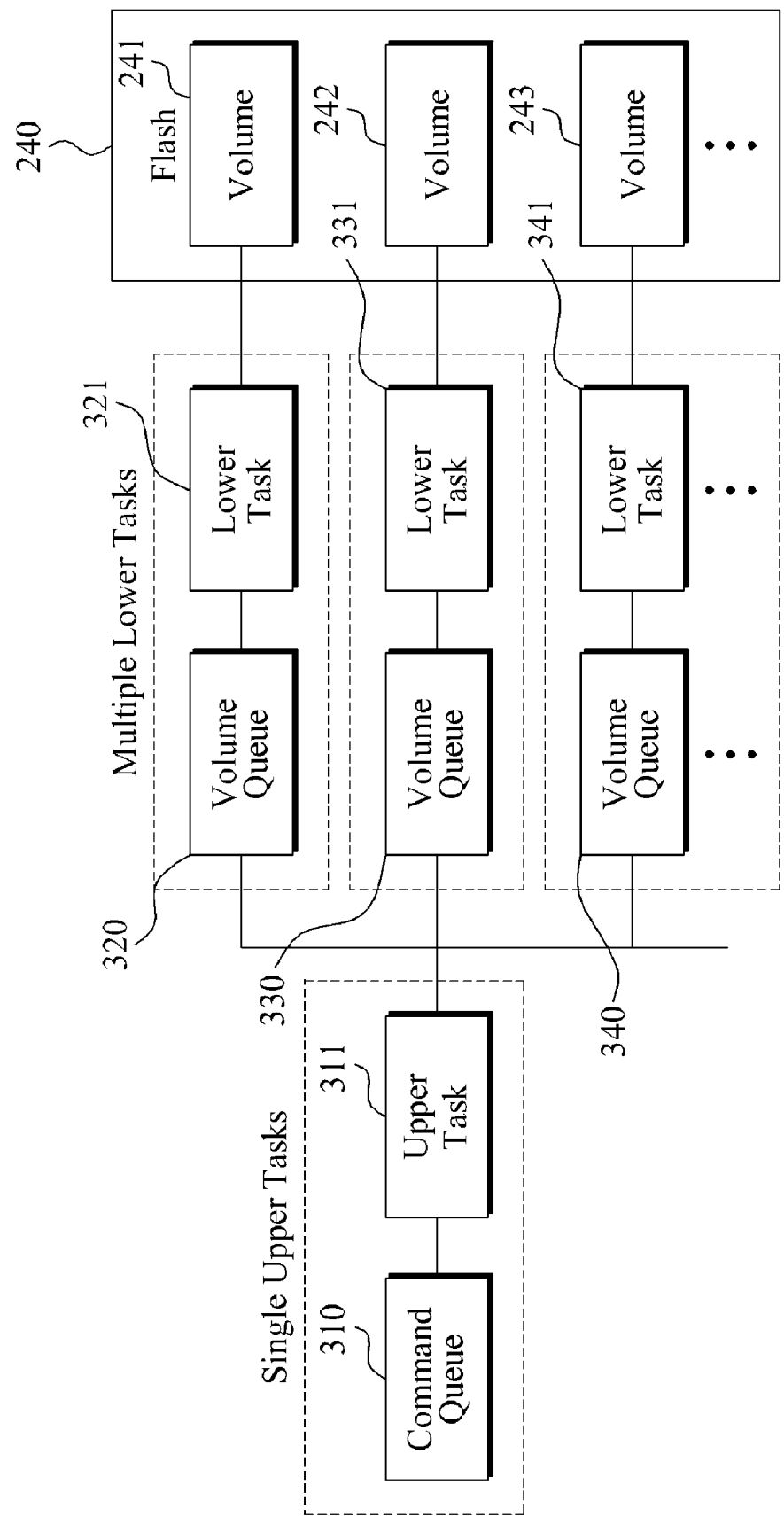
FIG. 3 is a block diagram of an exemplary memory device.

FIG. 3 illustrates an exemplary memory device.

The first controller 201 (shown in FIG. 2) stores a first command received from the host 121 in a first command queue 310. Also, the first controller 201 performs an upper task that determines a volume that relates to a first command dequeued in the first command queue 310 among a plurality of volumes 241 to 243 of a flash memory 240. If the first command relates to the volume 241, the first controller 201 transmits the first command to a second controller that controls a second command queue 320 relating to the first command among a plurality of second command queues (or volume queues) 320 to 340.

The second controller 202 stores the first command in the second command queue 320. After the first command is dequeued from the second command queue 320, the second controller 202 translates a logical address relating to the command into a physical address using an FTL, and performs a lower task 321 that transmits the first command to the flash memory 240 via an FIL.

A resource, such as the CPU 110, of the memory device, may perform another task, while the first command dequeued from the second command queue 320 is performed in the volume 241 of the flash memory. A state in which the resource of the memory device awaits to process a next command while a command is performed in the flash memory is referred to as an idle state or a busy condition. To minimize or reduce the time in the idle state, the memory device may perform a lower task with respect to another command, while a single command is performed in the flash memory 240.

As an example, while the first command is performed in the volume 241 of the flash memory, a second command is dequeued from the second command queue 330 or the second command queue 340. Also, the second controller performs lower task 331 or 341 with respect to the second command. Also, the second command is transmitted to the flash memory 240.

In the same manner, a plurality of commands dequeued from the plurality of second command queues are respectively transmitted to the flash memory and are processed in parallel. The parallel processing is performed until the second command queues 320 to 340 are empty. Also, when the second command queues 320 to 340 are empty, the first controller 201 dequeues another command from the first command queue 310, performs the upper task 311, and transmits the command to the second controller 202.

In some implementations, when the second command queues 320 to 340 and the first command queue 310 are empty, the first controller 201 receives a new command from the host 121 and inqueues the received new command to the first command queue 310.

Figure 4:
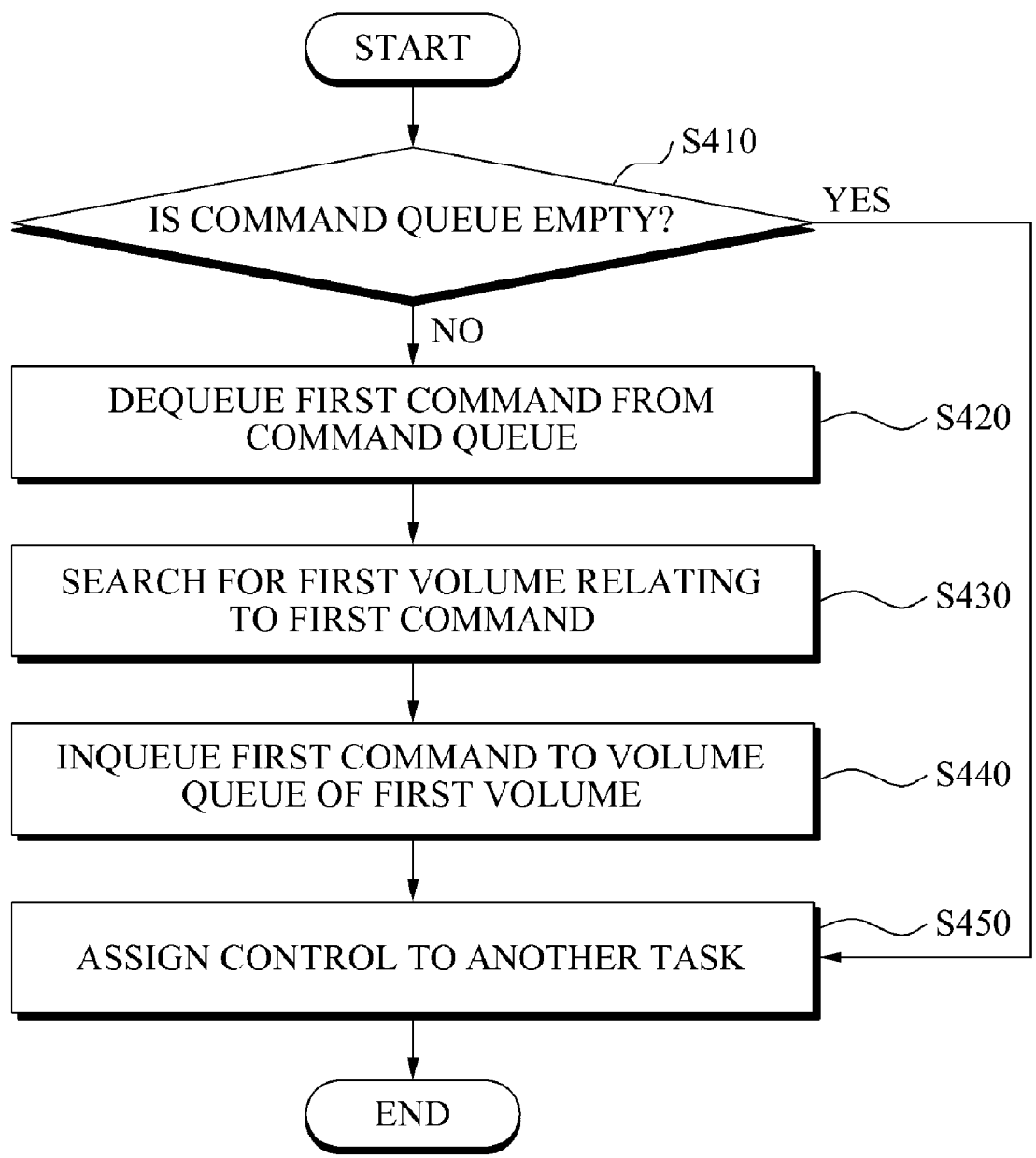
FIG. 4 is a flowchart of a procedure for controlling a memory.

FIG. 4 is a flowchart of an exemplary procedure for controlling a memory.

The first controller 201 determines whether a first command queue, hereinafter a command queue, is empty in operation S410. If the command queue is not empty, the first controller dequeues a first command from the command queue in operation S420.

The first controller 201 searches for a first volume relating to the first command from among a plurality of volumes of a flash memory in operation S430. A volume of the flash memory includes at least one memory channel. The first volume relating to the first command is a volume including a channel relating to the first command.

The second controller 202 inqueues to a second command queue, hereinafter a volume queue, relating to the first volume in operation S440.

Also, the first controller 201 assigns control in order to perform another task. The control is a state or authority of using a resource of a memory device. Accordingly, if the control is assigned to perform another task, the memory device is used for performing the other task.

If the command queue is empty in operation S410, the first controller 201 assigns the control to perform another task.

Figure 5:
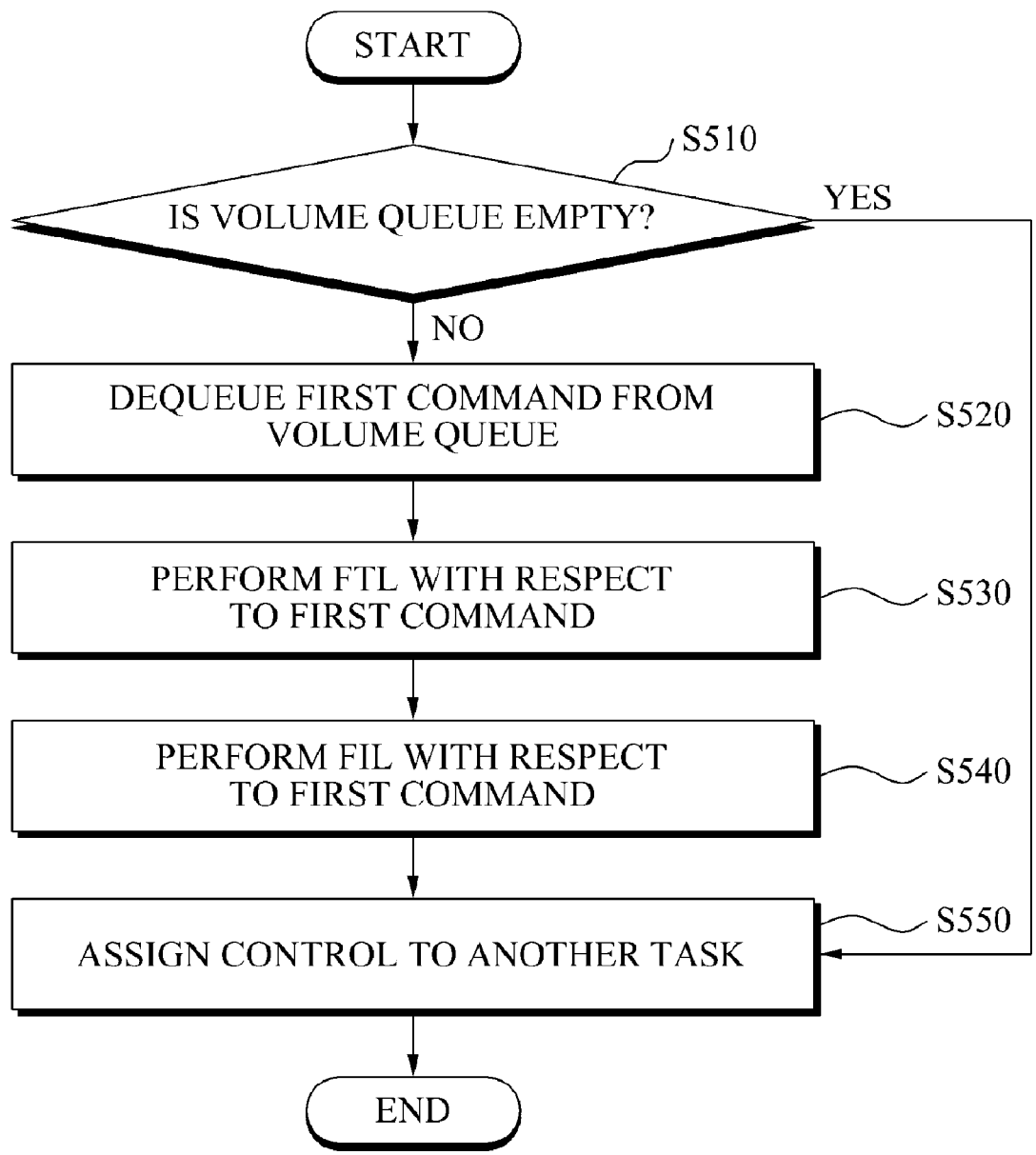
FIG. 5 is a flowchart of a procedure for controlling a memory.

FIG. 5 is a flowchart of an exemplary procedure for controlling a memory.

The second controller 202 determines whether a volume queue is empty in operation S510. When a command to be dequeued exists in the volume queue, the volume queue is not empty.

If the volume queue is not empty, the second controller 202 dequeues a first command among commands stored in the volume queue in operation S520.

Also, a logical page address corresponding to the first command is translated into a physical page address using an FTL in operation S530. The FTL may be designed by using a page level mapping, a block level mapping, or a log mapping scheme.

The page level mapping is a scheme that stores a one-to-one mapping relation between the logical page address and the physical page address in the FTL. Also, the block level mapping is a scheme that stores mapping information by a block unit in the FTL, and determines a mapping relation referring to a page offset of the logical page address. Although the log mapping scheme basically performs like the block mapping scheme, the log mapping scheme writes data of an updated page in a log block.

The above described configuration of the FTL is an example, and one skilled in the art may readily understand a configuration and a type of the FTL. Also, the one skilled in the art may change the configuration of the FTL without departing from the principles and spirit of the present example embodiments, which may be considered in the scope of the present example embodiments.

The first command is transmitted to the flash memory in operation S540. In this instance, an FIL is used. The FIL is a standard for communication between the flash memory and a memory controller or another element such as a buffer and the like. The FIL need not be limited to a specific configuration and may include a device for transmitting the first command to the flash memory (or to the flash memory controller), software, and the like.

The second controller 202 assigns control in order to perform another task in operation S550. The control has been described with reference to FIG. 4.

If the volume queue is empty in operation S510, the second controller 202 may bypass operations S520 to S540, and assign control in order to perform the other task in operation S550.

The other task to which the second controller 202 assigns the control in operation S550 is a task performing operations S510 to S550 in another volume queue excluding the volume queue. Also, if the volume queues of the memory device are empty, the other task to which the second controller 202 assigns the control in operation S550 is a task performing operations S410 to S450 of FIG. 4 in a command queue.

Figure 6:
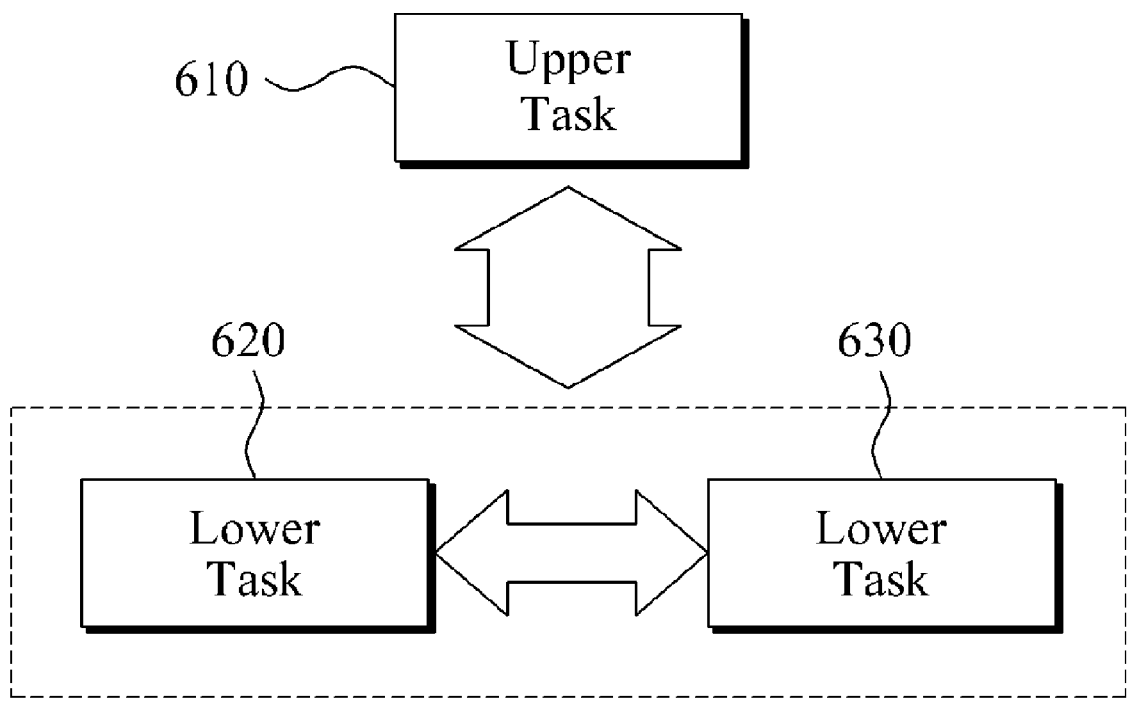
FIG. 6 is a conceptual block diagram of an operation between a first controller and a plurality of second controllers.

FIG. 6 is a conceptual diagram of an exemplary method of assigning control between the first controller 201 and a plurality of second controllers 202.

The assignment of the control can be understood as a multi-tasking scheduling. Various scheduling methods may exist depending on a multi-task configuration. Control may be assigned to another task if waiting due to a busy condition occurs with respect to a specific task. Accordingly, the busy condition may reduce an idle time of a resource of a memory device such as a CPU, and may efficiently perform multi tasking, thereby increasing efficiency of a parallel processing.

As described above, commands received from a host are stored in a command queue. Also, an upper task 610 is a task that determines a volume to which the first command belongs among a plurality of volumes and transmits the first command to a volume queue, where the first command is dequeued.

Also, a lower task 620 or 630 is a task that determines a physical page address with respect to the first command via an FTL and transmits the physical page address to a flash memory via an FIL, where the volume queue that receives and inqueues the first command dequeues the first command.

Control, which is a state or authority of occupying or using a resource of a memory device such as a CPU and the like, is assigned between the upper task 610 and the lower task 620 and 630.

If, for example, priority between the lower task 620 and the lower task 630 is the same and waiting due to a busy condition occurs with respect to all the lower tasks 620 and 630, the control is assigned to perform the upper task 610.

The priority may vary depending on a change of other factors, such as efficiency of command processing, an operation rate of the flash memory, and the like, during a multi tasking scheduling.

As an example, if the operation rate of the flash memory becomes remarkably fast compared with a communication speed between the memory device and the host, a priority of the upper task 610 may be higher than the priority of the lower task 620 or 630.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Flash memory devices and/or memory controllers according to example embodiments may be embodied using various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Quad Flatpack (QFP), Plastic Metric Quad Flat Pack (MQFP), Thin Quad Flatpack (TQFP), Small Outline Integrated Circuit (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even where power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a digital video disk (DVD), a router, and a Global Positioning System (GPS).

A computing system according to example embodiments may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. Where the computing system is a mobile apparatus, a battery may be additionally provided to supply operation voltage of the computing system.

It will be apparent to those of ordinary skill in the art that the computing system according to example embodiments may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory device comprising:
a first controller configured to receive a first command from a host, to store the first command in a first command queue, and to transmit the first command to a second controller relating to the first command stored in the first command queue; and
the second controller configured to store the first command received from the first controller in a second command queue, and to transmit the first command stored in the second command queue to a flash memory, wherein
the first controller comprises a Host Interface Layer (HIL) used for communicating with the host.

2. The memory device of claim 1, wherein the second controller comprises:
a Flash Translation Layer (FTL) configured to store mapping information between a logical page address corresponding to the first command and a physical page address corresponding to the first command; and
a Flash Interface Layer (FIL) configured to communicate between the second controller and the flash memory.

3. The memory device of claim 1, wherein, in response to the second command queue not being empty, the second controller is configured to transmit the command stored in the second command queue to the flash memory, and, in response to the second command queue being empty, the first controller is configured to transmit the command stored in the first command queue to the second controller.

4. A memory device comprising:
a first controller configured to store a command received from a host in a first command queue; and
a plurality of second controllers configured to store, respectively, a command received from the first controller in a second command queue, and to transmit, respectively, a command read from the second command queue to a flash memory,
wherein the first controller is configured to read a first command from the first command queue, search for a second controller relating to the first command from among the plurality of the second controllers, and transmit the first command to the second controller relating to the first command, wherein
the first controller comprises a Host Interface Layer (HIL) to communicate with the host.

5. The memory device of claim 4, wherein the second controller comprises:
- a Flash Translation Layer (FTL) configured to store mapping information between a logical page address corresponding to the first command and a physical page address corresponding to the first command; and
- a Flash Interface Layer (FIL) configured to communicate with the second controller and the flash memory.

6. The memory device of claim 4, wherein, in response to a command that is not transmitted to the flash memory existing in at least one second command queue of the plurality of the second controllers, the first controller is configured to read the command stored in the first command queue and to transmit the read command to the second controller, after transmitting the command, which was not transmitted to the flash memory, to the flash memory.

7. The memory device of claim 4, wherein the flash memory comprises a plurality of volumes, the plurality of volumes respectively corresponding to the plurality of second controllers.

8. The memory device of claim 7, wherein each of the plurality of volumes comprises at least one flash memory channel.

9. A method of controlling a memory, the method comprising:
- storing commands received from a host in a first command queue;
- reading a first command from the commands that are stored in the first command queue; and
- storing the first command in a second command queue, wherein:
- the reading and the storing of the first command in the second command queue comprises:
- reading the first command stored in the first command queue,
- searching for a second command queue relating to the first command, and
- storing the first command in the second command queue.

10. The method of claim 9, further comprising:
- reading the first command from the second command queue, and
- transmitting the read first command to a flash memory.

11. The method of claim 10, wherein the reading from the second command queue and the transmitting of the first command comprises:
- reading the first command from the second command queue;
- translating a logical page address corresponding to the first command into a physical page address corresponding to the first command; and
- transmitting the first command and physical page address information of the first command to the flash memory.

12. The method of claim 9, further comprising:
- reading a second command stored in the first command queue, and
- storing the read second command in the second command queue when the second command queue is empty.

13. A non-transitory computer-readable medium comprising instructions, that when executed by a computer, cause the computer to:
- store commands received from a host in a first command queue;
- read a first command from the commands that are stored in the first command queue; and
- store the first command in a second command queue, wherein:
- the reading and the storing of the first command in the second command queue comprises:
- reading the first command stored in the first command queue,
- searching for a second command queue relating to the first command, and storing the first command in the second command queue.

* * * * *